(12) United States Patent
Tharoor et al.

(10) Patent No.: US 11,631,070 B2
(45) Date of Patent: Apr. 18, 2023

(54) SYSTEM, METHOD, AND COMPUTER PROGRAM PRODUCT FOR PROCESSING A TRANSACTION AS A PUSH PAYMENT TRANSACTION

(71) Applicant: Visa International Service Association, San Francisco, CA (US)

(72) Inventors: Sandeep Tharoor, Anjumoorthy (IN); Malayamkumarath Sreedharan Manikandan, Cox Town (IN)

(73) Assignee: Visa International Service Association, San Francisco, CA (US)

( * ) Notice: Subject to any disclaimer, the term of this patent is extended or adjusted under 35 U.S.C. 154(b) by 439 days.

(21) Appl. No.: 16/751,419

(22) Filed: Jan. 24, 2020

(65) Prior Publication Data
US 2021/0233052 A1    Jul. 29, 2021

(51) Int. Cl.
| | |
|---|---|
| *G06Q 20/20* | (2012.01) |
| *G06Q 20/40* | (2012.01) |
| *G06Q 40/02* | (2023.01) |
| *H04L 9/40* | (2022.01) |
| *H04W 12/06* | (2021.01) |

(52) U.S. Cl.
CPC ......... *G06Q 20/20* (2013.01); *G06Q 20/4014* (2013.01); *G06Q 40/02* (2013.01); *H04L 63/0884* (2013.01); *H04L 63/123* (2013.01); *H04W 12/06* (2013.01); *G06Q 20/204* (2013.01)

(58) Field of Classification Search
CPC ........ G06Q 30/04; G06Q 20/14; G06Q 20/28; G06Q 20/32; G06Q 20/204; G06Q 20/36; G06Q 20/40; G06Q 20/26; G06Q 20/023; G06Q 20/02; G06Q 30/06; G06Q 40/02; G06Q 20/10; G06Q 10/10; G06Q 20/20; G06F 21/6245; G06F 16/27; G06F 3/0481; G06F 21/64
USPC ........... 705/16, 17, 26.41, 39, 40, 44, 64, 72
See application file for complete search history.

(56) References Cited

U.S. PATENT DOCUMENTS

| | | | |
|---|---|---|---|
| 2005/0177510 A1* | 8/2005 | Hilt ........................ | G06Q 20/10 705/40 |
| 2014/0344156 A1* | 11/2014 | Hilt ...................... | G06Q 20/108 705/44 |
| 2016/0253651 A1* | 9/2016 | Park ...................... | G06Q 20/34 705/39 |
| 2016/0283918 A1* | 9/2016 | Weinflash ............ | G06Q 20/403 |

(Continued)

*Primary Examiner* — Olusegun Goyea
(74) *Attorney, Agent, or Firm* — The Webb Law Firm (57) ABSTRACT

Described are a system, method, and computer program product for processing a transaction as a push payment transaction. The method may include receiving, with a payment gateway processor, a transaction request from a merchant system. The transaction request may include transaction data associated with a payment device of a user, the payment device being associated with an issuer system. The method may also include generating, with the payment gateway processor, an authentication request based on the transaction data. The method may further include communicating, with the payment gateway processor, the authentication request to the issuer system. The method may further include, in response to the issuer system authenticating the authentication request, generating a push payment request including an account identifier associated with the merchant system, and communicating the push payment request to the issuer system.

15 Claims, 4 Drawing Sheets

(56) References Cited

U.S. PATENT DOCUMENTS

| | | | |
|---|---|---|---|
| 2016/0300206 A1* | 10/2016 | Novac | G06Q 20/405 |
| 2016/0300207 A1* | 10/2016 | Novac | G06Q 20/405 |
| 2016/0300225 A1* | 10/2016 | Novac | G06Q 20/405 |
| 2016/0300226 A1* | 10/2016 | Novac | G06Q 20/4016 |
| 2017/0140374 A1* | 5/2017 | O'Brien | G06Q 50/265 |
| 2017/0237554 A1* | 8/2017 | Jacobs | H04L 9/3236 |
| | | | 713/171 |
| 2017/0300881 A1* | 10/2017 | Weinflash | G06Q 20/386 |
| 2018/0158042 A1* | 6/2018 | Finch | G06Q 20/204 |
| 2018/0276658 A1* | 9/2018 | Liscia | G06Q 20/102 |
| 2019/0289019 A1* | 9/2019 | Thekadath | G06F 16/27 |
| 2019/0318354 A1* | 10/2019 | Weinflash | G06Q 20/14 |
| 2019/0378182 A1* | 12/2019 | Weinflash | G06Q 30/04 |

* cited by examiner

SYSTEM, METHOD, AND COMPUTER PROGRAM PRODUCT FOR PROCESSING A TRANSACTION AS A PUSH PAYMENT TRANSACTION

BACKGROUND

1. Technical Field

Disclosed embodiments or aspects relate generally to computer networked payment processing systems and, in one particular embodiment or aspect, to a system, method, and computer program product for processing a transaction as a push payment transaction.

2. Technical Considerations

In transactions between users of payment devices and merchants, a transaction may be initiated by a user interacting with a point-of-sale (POS) terminal, which prompts user authentication. Post-authentication, the POS terminal may communicate with an acquirer server to trigger a "pull" transaction via a transaction processing system, in which a merchant system initiates a transaction request to an issuer system for payment to the merchant system.

In contrast, "push" payments may be initiated by a user with a payment device to complete a transaction, generated from the issuer system to the merchant system. However, "push" payments may require the user to know a merchant identifier to which a payment may be directed. The user may then communicate with an issuer system to initiate a push payment transaction from the issuer system to the acquirer system via a transaction processing system. Such forms of push payment schemes require identifying information be provided to a user and do not promote merchant involvement.

There is a need in the art for enabling a transaction between a payment device and a merchant's POS terminal as a push payment transaction without knowledge requirements on behalf of a user.

SUMMARY

Accordingly, and generally, provided is an improved system, method, and computer program product for processing a transaction as a push payment transaction. Preferably, provided is a system, method, and computer program product for receiving a transaction request from a merchant system including transaction data associated with a payment device of a user, the payment device associated with an issuer system. Preferably, provided is a system, method, and computer program product for generating an authentication request based on the transaction data and communicating the authentication request to an issuer authentication processing system. Preferably, provided is a system, method, and computer program product for, in response to the issuer authentication processing system authenticating the authentication request, generating a push payment request including an authentication response and an account identifier associated with the merchant system and communicating the push payment request to an issuer payment processing system.

According to non-limiting embodiments or aspects, provided is a method of processing a transaction as a push payment transaction. The method may include receiving, with at least one payment gateway processor, a transaction request from a merchant system. The transaction request may include transaction data associated with a payment device of a user and the payment device may be associated with an issuer system. The method may also include generating, with the at least one payment gateway processor, an authentication request based on the transaction data. The method may further include communicating, with the at least one payment gateway processor, the authentication request to an issuer authentication processing system. The method may further include, in response to the issuer authentication processing system authenticating the authentication request, generating a push payment request including an authentication response and an account identifier associated with the merchant system. The method may further include communicating the push payment request to an issuer payment processing system. The method may further include, in response to the issuer payment processing system validating the authentication response, initiating a push payment transaction to an acquirer system via a transaction processing system.

In some non-limiting embodiments or aspects, the transaction may include an electronic commerce transaction initiated by a communication from a computing device of the user to the merchant system. Generating the push payment request may include the at least one payment gateway processor generating the push payment request.

In some non-limiting embodiments or aspects, generating the push payment request may include the issuer authentication processing system generating the push payment request. The authentication request may include an authentication verifying data element.

In some non-limiting embodiments or aspects, the method may further include, prior to generating the authentication request, determining, with the at least one payment gateway processor, whether the issuer system is enabled for processing the transaction as a push payment transaction based on the transaction data. Communicating the push payment request to the issuer payment processing system may cause the issuer payment processing system to process the transaction as a push payment transaction.

According to non-limiting embodiments or aspects, provided is a system for processing a transaction as a push payment transaction. The system may include at least one payment gateway server computer including at least one payment gateway processor. The at least one payment gateway server computer may be programmed and/or configured to receive a transaction request from a merchant system. The transaction request may include transaction data associated with a payment device of a user. The payment device may be associated with an issuer system. The at least one payment gateway server computer may be programmed and/or configured to generate an authentication request based on the transaction data. The at least one payment gateway server computer may be programmed and/or configured to communicate the authentication request to an issuer authentication processing system. The at least one payment gateway server computer may be programmed and/or configured to, in response to the issuer authentication processing system authenticating the authentication request, generate a push payment request including an authentication response and an account identifier associated with the merchant system. The at least one payment gateway server computer may be programmed and/or configured to communicate the push payment request to an issuer payment processing system. The at least one payment gateway server computer may be programmed and/or configured to, in response to the issuer payment processing system validating the authentication response, initiate a push payment transaction to an acquirer system via a transaction processing system.

In some non-limiting embodiments or aspects, the transaction may include an electronic commerce transaction initiated by a communication from a computing device of the user to the merchant system. The authentication request may include an authentication verifying data element.

In some non-limiting embodiments or aspects, the at least one payment gateway server computer may be further programmed and/or configured to, prior to generating the authentication request, determine whether the issuer system is enabled for processing the transaction as a push payment transaction based on the transaction data.

In some non-limiting embodiments or aspects, communicating the push payment request to the issuer payment processing system may cause the issuer payment processing system to process the transaction as a push payment transaction.

According to non-limiting embodiments or aspects, provided is a computer program product for processing a transaction as a push payment transaction. The computer program product may include at least one non-transitory computer-readable medium including program instructions that, when executed by at least one processor, cause the at least one processor to receive a transaction request from a merchant system. The transaction request may include transaction data associated with a payment device of a user. The payment device may be associated with an issuer system. The program instructions may also cause the at least one processor to generate an authentication request based on the transaction data and communicate the authentication request to the issuer authentication processing system. The program instructions may also cause the at least one processor to, in response to the issuer authentication processing system authenticating the authentication request, generate a push payment request including an authentication response and an account identifier associated with the merchant system. The program instructions may also cause the at least one processor to communicate the push payment request to an issuer payment processing system. The program instructions may also cause the at least one processor to, in response to the issuer payment processing system validating the authentication response, initiate a push payment transaction to an acquirer system via a transaction processing system.

In some non-limiting embodiments or aspects, the transaction may include an electronic commerce transaction initiated by a communication from a computing device of the user to the merchant system. The at least one processor may include at least one payment gateway processor. The authentication request may include an authentication verifying data element.

In some non-limiting embodiments or aspects, the program instructions may further cause the at least one processor to, prior to generating the authentication request, determine whether the issuer system is enabled for processing the transaction as a push payment transaction based on the transaction data. Communicating the push payment request to the issuer payment processing system may cause the issuer payment processing system to process the transaction as a push payment transaction.

According to non-limiting embodiments or aspects, provided is a method of processing a transaction as a push payment transaction. The method may include receiving, with at least one payment gateway processor, a transaction request from a merchant system. The transaction request may include transaction data associated with a payment device of a user. The payment device may be associated with an issuer system. The method may also include generating, with the at least one payment gateway processor, a request including an account identifier associated with the merchant system and at least a portion of the transaction data. The method may further include communicating the request to the issuer system to cause the issuer system to authenticate the request based on the transaction data and, in response to authenticating the request, process the transaction as a push payment based on the account identifier associated with the merchant system.

In some non-limiting embodiments or aspects, the transaction may include an electronic commerce transaction initiated by a communication from a computing device of the user to the merchant system.

According to non-limiting embodiments or aspects, provided is a system for processing a transaction as a push payment transaction. The system may include at least one payment gateway server computer including at least one payment gateway processor. The at least one payment gateway server computer may be programmed and/or configured to receive a transaction request from a merchant system. The transaction request may include transaction data associated with a payment device of a user. The payment device may be associated with an issuer system. The at least one payment gateway server computer may be programmed and/or configured to generate a request including an account identifier associated with the merchant system and at least a portion of the transaction data. The at least one payment gateway server computer may be programmed and/or configured to communicate the request to the issuer system to cause the issuer system to: authenticate the request based on the transaction data; and in response to authenticating the request, process the transaction as a push payment based on the account identifier associated with the merchant system.

In some non-limiting embodiments or aspects, the transaction may include an electronic commerce transaction initiated by a communication from a computing device of the user to the merchant system.

Other non-limiting embodiments or aspects of the present disclosure will be set forth in the following numbered clauses:

Clause 1: A method of processing a transaction as a push payment transaction, comprising: receiving, with at least one payment gateway processor, a transaction request from a merchant system, the transaction request comprising transaction data associated with a payment device of a user, the payment device associated with an issuer system; generating, with the at least one payment gateway processor, an authentication request based on the transaction data; communicating, with the at least one payment gateway processor, the authentication request to an issuer authentication processing system; in response to the issuer authentication processing system authenticating the authentication request, generating a push payment request comprising an authentication response and an account identifier associated with the merchant system; communicating the push payment request to an issuer payment processing system; and, in response to the issuer payment processing system validating the authentication response, initiating a push payment transaction to an acquirer system via a transaction processing system.

Clause 2: The method of clause 1, wherein the transaction comprises an electronic commerce transaction initiated by a communication from a computing device of the user to the merchant system.

Clause 3: The method of clause 1 or 2, wherein generating the push payment request comprises the at least one payment gateway processor generating the push payment request.

Clause 4: The method of any of clauses 1-3, wherein generating the push payment request comprises the issuer authentication processing system generating the push payment request.

Clause 5: The method of any of clauses 1-4, wherein the authentication request comprises an authentication verifying data element.

Clause 6: The method of any of clauses 1-5, further comprising, prior to generating the authentication request, determining, with the at least one payment gateway processor, whether the issuer system is enabled for processing the transaction as a push payment transaction based on the transaction data.

Clause 7: The method of any of clauses 1-6, wherein communicating the push payment request to the issuer payment processing system causes the issuer payment processing system to process the transaction as a push payment transaction.

Clause 8: A system for processing a transaction as a push payment transaction, the system comprising at least one payment gateway server computer including at least one payment gateway processor, the at least one payment gateway server computer programmed and/or configured to: receive a transaction request from a merchant system, the transaction request comprising transaction data associated with a payment device of a user, the payment device associated with an issuer system; generate an authentication request based on the transaction data; communicate the authentication request to an issuer authentication processing system; in response to the issuer authentication processing system authenticating the authentication request, generate a push payment request comprising an authentication response and an account identifier associated with the merchant system; communicate the push payment request to an issuer payment processing system; and, in response to the issuer payment processing system validating the authentication response, initiate a push payment transaction to an acquirer system via a transaction processing system.

Clause 9: The system of clause 8, wherein the transaction comprises an electronic commerce transaction initiated by a communication from a computing device of the user to the merchant system.

Clause 10: The system of clause 8 or 9, wherein the authentication request comprises an authentication verifying data element.

Clause 11: The system of any of clauses 8-10, wherein the at least one payment gateway server computer is further programmed and/or configured to, prior to generating the authentication request, determine whether the issuer system is enabled for processing the transaction as a push payment transaction based on the transaction data.

Clause 12: The system of any of clauses 8-11, wherein communicating the push payment request to the issuer payment processing system causes the issuer payment processing system to process the transaction as a push payment transaction.

Clause 13: A computer program product for processing a transaction as a push payment transaction, the computer program product comprising at least one non-transitory computer-readable medium including program instructions that, when executed by at least one processor, cause the at least one processor to: receive a transaction request from a merchant system, the transaction request comprising transaction data associated with a payment device of a user, the payment device associated with an issuer system; generate an authentication request based on the transaction data; communicate the authentication request to an issuer authentication processing system; in response to the issuer authentication processing system authenticating the authentication request, generate a push payment request comprising an authentication response and an account identifier associated with the merchant system; communicate the push payment request to an issuer payment processing system; and, in response to the issuer payment processing system validating the authentication response, initiate a push payment transaction to an acquirer system via a transaction processing system.

Clause 14: The computer program product of clause 13, wherein the transaction comprises an electronic commerce transaction initiated by a communication from a computing device of the user to the merchant system.

Clause 15: The computer program product of clause 13 or 14, wherein the at least one processor comprises at least one payment gateway processor.

Clause 16: The computer program product of any of clauses 13-15, wherein the authentication request comprises an authentication verifying data element.

Clause 17: The computer program product of any of clauses 13-16, wherein the program instructions further cause the at least one processor to, prior to generating the authentication request, determine whether the issuer system is enabled for processing the transaction as a push payment transaction based on the transaction data.

Clause 18: The computer program product of any of clauses 13-17, wherein communicating the push payment request to the issuer payment processing system causes the issuer payment processing system to process the transaction as a push payment transaction.

Clause 19: A method of processing a transaction as a push payment transaction, comprising: receiving, with at least one payment gateway processor, a transaction request from a merchant system, the transaction request comprising transaction data associated with a payment device of a user, the payment device associated with an issuer system; generating, with the at least one payment gateway processor, a request comprising an account identifier associated with the merchant system and at least a portion of the transaction data, and communicating the request to the issuer system to cause the issuer system to: authenticate the request based on the transaction data; and in response to authenticating the request, process the transaction as a push payment based on the account identifier associated with the merchant system.

Clause 20: The method of clause 19, wherein the transaction comprises an electronic commerce transaction initiated by a communication from a computing device of the user to the merchant system.

Clause 21: A system for processing a transaction as a push payment transaction, the system comprising at least one payment gateway server computer including at least one payment gateway processor, the at least one payment gateway server computer programmed and/or configured to: receive a transaction request from a merchant system, the transaction request comprising transaction data associated with a payment device of a user, the payment device associated with an issuer system; generate a request comprising an account identifier associated with the merchant system and at least a portion of the transaction data, and communicate the request to the issuer system to cause the issuer system to: authenticate the request based on the transaction data; and in response to authenticating the request, process the transaction as a push payment based on the account identifier associated with the merchant system.

Clause 22: The system of clause 21, wherein the transaction comprises an electronic commerce transaction initiated by a communication from a computing device of the user to the merchant system.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments that are illustrated in the accompanying schematic figures, in which.

DETAILED DESCRIPTION

For purposes of the description hereinafter, the terms "upper", "lower", "right", "left", "vertical", "horizontal", "top", "bottom", "lateral", "longitudinal," and derivatives thereof shall relate to non-limiting embodiments as they are oriented in the drawing figures. However, it is to be understood that non-limiting embodiments may assume various alternative variations and step sequences, except where expressly specified to the contrary. It is also to be understood that the specific devices and processes illustrated in the attached drawings, and described in the following specification, are simply exemplary embodiments. Hence, specific dimensions and other physical characteristics related to the embodiments disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partly on" unless explicitly stated otherwise.

Some non-limiting embodiments are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

As used herein, the terms "communication" and "communicate" may refer to the reception, receipt, transmission, transfer, provision, and/or the like, of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet, and/or the like) that includes data. Any known electronic communication protocols and/or algorithms may be used such as, for example, TCP/IP (including HTTP and other protocols), WLAN (including 802.11 and other radio frequency-based protocols and methods), analog transmissions, cellular networks (e.g., Global System for Mobile Communications (GSM), Code Division Multiple Access (CDMA), Long-Term Evolution (LTE), Worldwide Interoperability for Microwave Access (WiMAX), etc.), and/or the like. It will be appreciated that numerous other arrangements are possible.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The term "client device," as used herein, refers to any electronic device that is configured to communicate with one or more servers or remote devices and/or systems. A client device may include a mobile device, a network-enabled appliance (e.g., a network-enabled television, refrigerator, thermostat, and/or the like), a computer, a POS ("point-of-sale") system, and/or any other device or system capable of communicating with a network.

As used herein, the term "computing device" may refer to one or more electronic devices configured to process data. A computing device may, in some examples, include the necessary components to receive, process, and output data, such as a processor, a display, a memory, an input device, a network interface, and/or the like. The computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. The computing device may not be a mobile device, such as a desktop computer. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, etc.).

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications, a token service executing one or more software applications, and/or the like. A transaction processing server may include one or more processors and, in some non-limiting embodiments, may be operated by or on behalf of a transaction service provider.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a payment device, such as a physical payment instrument, e.g., a payment card, and/or may be electronic and used for electronic payments. The term "issuer system" refers to one or more computer systems operated by or on behalf of an issuer institution, such as a server computer executing one or more software applications. For example, an issuer system may include one or more authorization servers for authorizing a transaction. An issuer system may include an "issuer authentication processing system," which may include one or more servers configured to authenticate a transaction authentication request. An issuer system may include an "issuer payment processing system," which may include one or more servers configured to validate authentication responses from an issuer authentication processing system and initiate the processing of one or more transactions. One or more servers configured for one process of an issuer system may include one or more same servers configured for another process of an issuer system.

As used herein, the term "acquirer institution" may refer to an entity licensed and/or approved by the transaction service provider to originate transactions (e.g., payment transactions) using a payment device associated with the transaction service provider. The transactions the acquirer institution may originate may include payment transactions (e.g., purchases, original credit transactions (OCTs), account funding transactions (AFTs), and/or the like). In some non-limiting embodiments, an acquirer institution may be a bank. As used herein, the term "acquirer system" may refer to one or more computer systems, computer devices, software applications, and/or the like operated by or on behalf of an acquirer institution.

As used herein, the terms "authenticating system" and "authentication system" may refer to one or more computing devices that authenticate a user and/or an account, such as but not limited to a transaction processing system, merchant system, issuer system, payment gateway, a third-party authenticating service, and/or the like.

As used herein, the term "payment device" may refer to a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a PDA, a pager, a security card, a computing device, an access card, a wireless terminal, a transponder, and/or the like. In some non-limiting embodiments, the payment device may include volatile or non-volatile memory to store information (e.g., an account identifier, a name of the account holder, and/or the like).

As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases and/or the like) such that they may be used to conduct a transaction without directly using the original account identifier. In some examples, an original account identifier, such as a PAN, may be associated with a plurality of tokens for different individuals or purposes.

As used herein, the term "merchant" may refer to an individual or entity that provides goods and/or services, or access to goods and/or services, to customers based on a transaction, such as a payment transaction. As used herein, the terms "merchant" or "merchant system" may also refer to one or more computer systems operated by or on behalf of a merchant, such as a server computer executing one or more software applications.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway.

As used herein, the term "server" or "server computer" may refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, e.g., POS devices, directly or indirectly communicating in the network environment may constitute a "system," such as a cloud provider system. Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Non-limiting embodiments or aspects of the present disclosure are directed to a system, method, and computer program product for processing a transaction between a payment device and a merchant POS terminal as a push payment transaction. The described arrangement of network architecture and components therein are configured to replace a pull payment transaction with a push payment transaction, after authentication of a transaction by a user. Described systems and methods reduce chargeback scenarios, improving monetary savings and reducing surplus computer traffic, minimizing computer resources required to execute an electronic payment processing network. Compared to a pull payment transaction, the described systems and methods further reduce the number of "hops," or node-to-node communications, within a transaction processing computer network. Furthermore, the described systems and methods provide increased implementation flexibility over prior art payment processing systems; not all issuers need to be configured for the described push payment protocol, as the described systems and methods include a directory server for verifying issuer configurations (e.g., enrollment).

Figure 1:
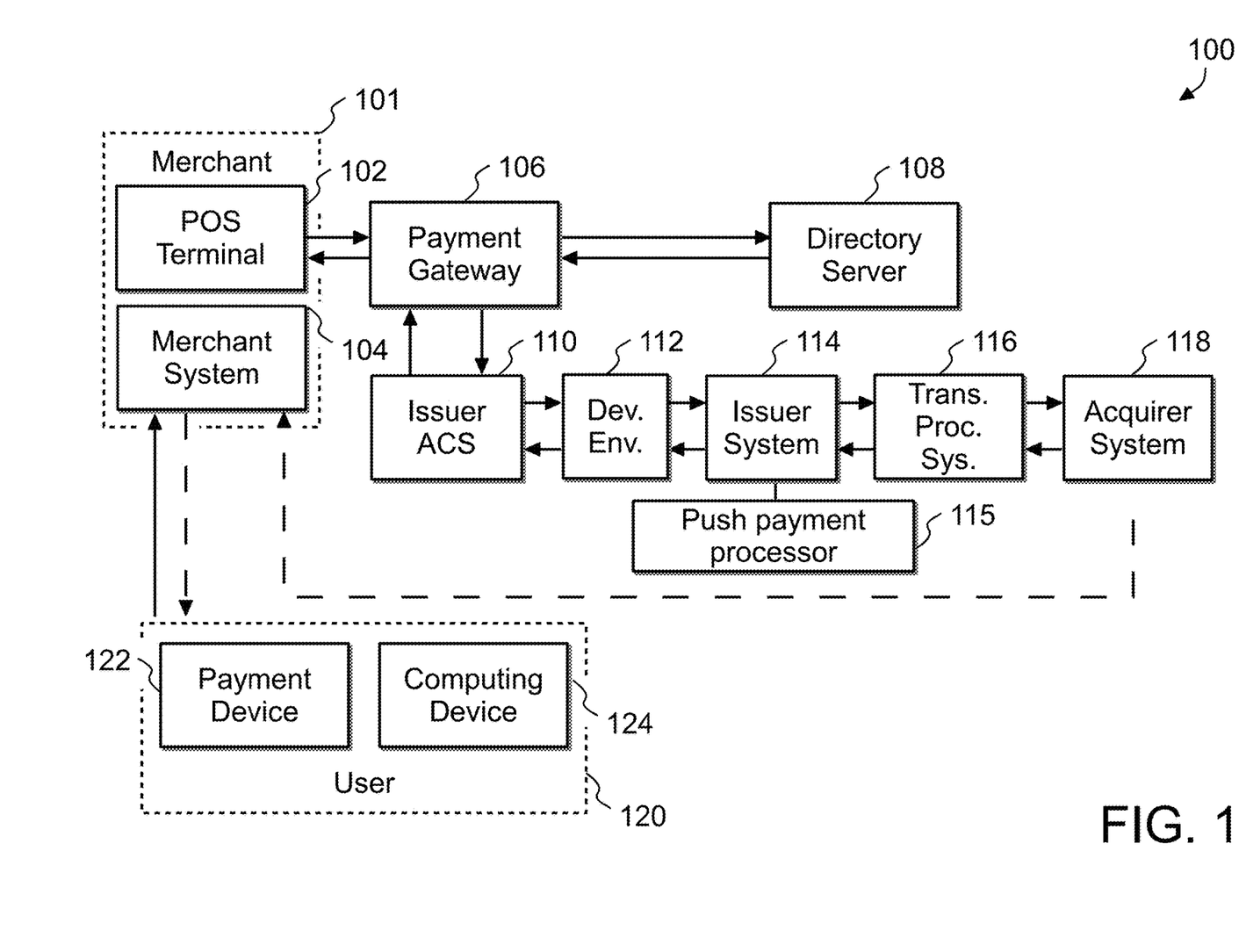
FIG. 1 is a schematic diagram of one embodiment or aspect of a system and method for processing a transaction as a push payment transaction.
Figure 2:
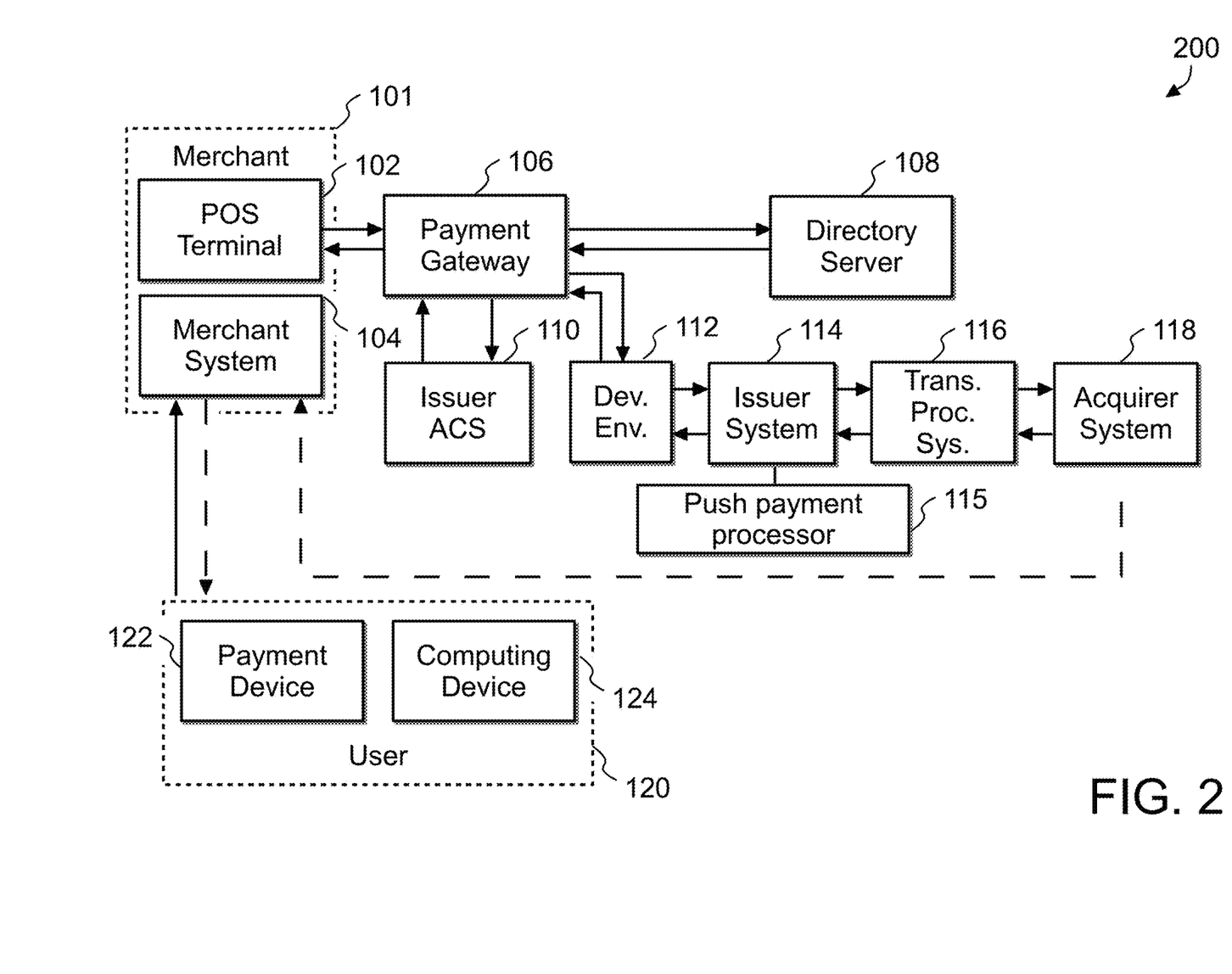
FIG. 2 is a schematic diagram of one embodiment or aspect of a system and method for processing a transaction as a push payment transaction.

With specific reference to FIGS. 1 and 2, and in some non-limiting embodiments or aspects, provided are a first system 100 and a second system 200 for processing a transaction as a push payment transaction. The systems 100, 200 may include a merchant 101 associated with a point-of-sale (POS) terminal 102 (e.g., online store interface, physical store computing device for completing transactions, etc.) and a merchant system 104, which may be communicatively interconnected. A user 120 may be associated with a payment device 122 and a computing device 124 and may use one or both to communicate with the POS terminal 102 of the merchant 101 to initiate a transaction request. The payment device 122 may be the same device as the computing device 124. The merchant system 104, via the POS terminal 102, may communicate a transaction request to at least one processor of a payment gateway 106. Based on an issuer identifier associated with the payment device 122, the at least one payment gateway 106 processor may communicate a verification request to a directory server 108 to determine whether or not the issuer of the payment device 122 is participating in the described push payment protocol. The directory server 108 may communicate a verification response to the payment gateway 106 indicating whether or not the issuer system 114 is configured to participate in the push payment protocol. The issuer system 114 may include an issuer access control server (ACS) 110 (e.g., issuer authentication processing system).

With further reference to FIG. 1, and in further non-limiting embodiments or aspects, the payment gateway 106 may generate and communicate a payment authentication request to an issuer ACS 110. The issuer ACS 110 may validate the request and generate a push payment request to a development environment 112 (e.g., at least one server configured to provide one or more application programming interfaces (APIs) for at least one transaction protocol). The development environment 112 may communicatively connect to the issuer system 114 to initiate a push payment transaction. The issuer system 114 may communicate with an acquirer system 118 via a transaction processing system 116 to complete the push payment transaction. The issuer system 114 may further be associated with a push payment processor 115 (e.g., issuer payment processing system) for initiating and completing a push payment transaction. The push payment transaction response may be communicated from the issuer system 114, e.g., the push payment processor 115, to the development environment 112, which may communicate a payment response to the payment gateway 106 via the issuer ACS 110. The payment gateway 106 may communicate a payment response to the merchant system 104, which may communicate that the transaction was completed to the user 120 through the POS terminal 102.

With further reference to FIG. 2, and in further non-limiting embodiments or aspects, the payment gateway 106 may generate and communicate a payment authentication request to an issuer ACS 110 (e.g., issuer authentication processing system). The issuer ACS 110 may validate the request and generate a validation response to at least one processor of the payment gateway 106. At least one payment gateway 106 processor may generate a push payment request to a development environment 112 (e.g., at least one server configured to provide one or more application programming interfaces (APIs) for at least one transaction protocol). The development environment 112 may communicatively connect to the issuer system 114 to initiate a push payment transaction. The issuer system 114 may communicate with an acquirer system 118 via a transaction processing system 116 to complete the push payment transaction. The issuer system 114 may further be associated with a push payment processor 115 (e.g., issuer payment processing system) for initiating and completing a push payment transaction. The push payment transaction response may be communicated from the issuer system 114, e.g., the push payment processor 115, to the development environment 112, which may communicate a payment response to the payment gateway 106. The payment gateway 106 may communicate a payment response to the merchant system 104, which may communicate that the transaction was completed to the user 120 through the POS terminal 102.

Figure 3:
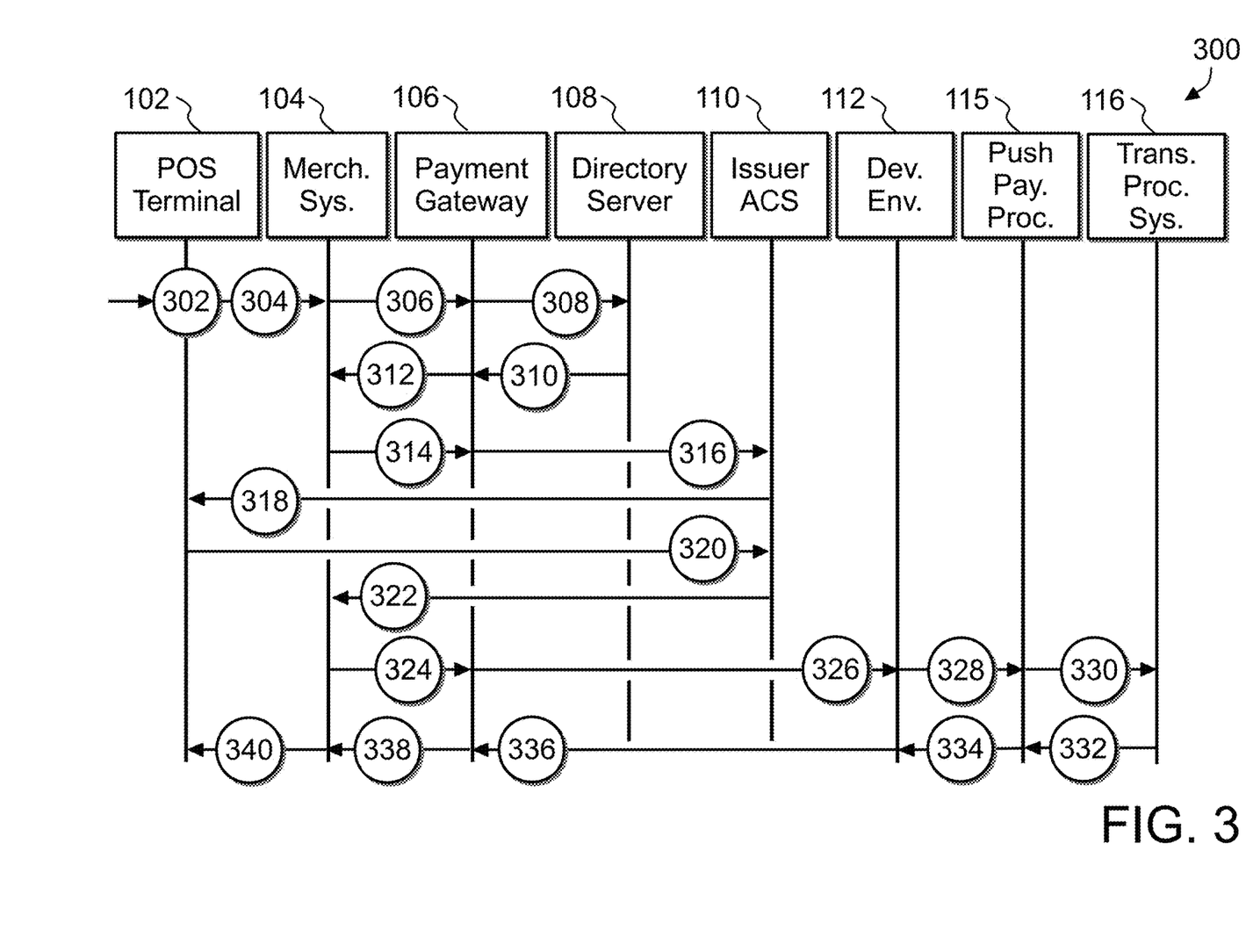
FIG. 3 is a flow diagram of one embodiment or aspect of a system and method for processing a transaction as a push payment transaction.

With specific reference to FIG. 3, and in some non-limiting embodiments or aspects, provided is a method 300 for processing a transaction as a push payment transaction. In step 302, the POS terminal 102 may receive an input from a user having a payment device that triggers a payment request (e.g., clicking a confirm button for online purchase, presentation of payment device, etc.). In step 304, the POS terminal 102 may communicate a transaction request to the merchant system 104. In step 306, the merchant system 104 may communicate a verify enrollment request to at least one payment gateway 106 processor. In step 308, at least one payment gateway 106 processor may send a communication to a directory server 108 to verify if an issuer associated with the payment device of the transaction is configured for push payment protocol. In step 310, the directory server may communicate back a verify enrollment response to at least one payment gateway 106 processor. If the issuer associated with the payment device used in the transaction is not configured for push payment protocol, the transaction may be declined or processed according to alternative protocol in step 312 (e.g., a pull payment transaction scheme). If the issuer associated with the payment device used in the transaction is configured for push payment protocol, the payment gateway 106 may communicate a verify enrollment response (e.g., a positive indication of issuer configuration), in step 312, to continue with the push payment protocol.

In step 314, the merchant system 104 may communicate a payment authentication request to at least one payment gateway 106 processor. In step 316, at least one payment gateway 106 processor may communicate a payment authentication request to an issuer access control server (ACS) 110 (e.g., issuer authentication processing system). In step 318, the issuer ACS 110 may communicate a request for user authentication credentials to the merchant POS terminal 102. In step 320, the merchant POS terminal 102 may communicate user authentication credentials to the issuer ACS 110. In step 322, the issuer ACS 110 may communicate a payment authentication response to the merchant system 104, directly or indirectly via the payment gateway 106. In step 324, the merchant system 104 may communicate a push payment request to the payment gateway 106. In step 326, at least one payment gateway 106 processor may generate a push payment request including an account identifier associated with the merchant system 104 and communicate the push payment request to the development environment 112. Alternatively, the issuer ACS 110 may generate a push payment request including an account identifier associated with the merchant system 104 and communicate the push payment request to the development environment 112.

In step 328, the development environment 112 may communicate a push payment request to a push payment processor 115 (e.g., issuer payment processing system), which may be associated with the issuer system 114. In step 330, the push payment processor 115 may communicate with a transaction processing system 116 to complete the push payment transaction. In step 332, the push payment processor 115 may receive from the transaction processing system 116 a push payment transaction response, which it may communicate to the development environment 112 in step 334. In step 336, the development environment 112 may communicate a payment response to at least one payment gateway 106 processor. In step 338, at least one payment gateway 106 processor may communicate a payment response to the merchant system 104, which may communicate a payment response to the POS terminal 102 in step 340.

Figure 4:
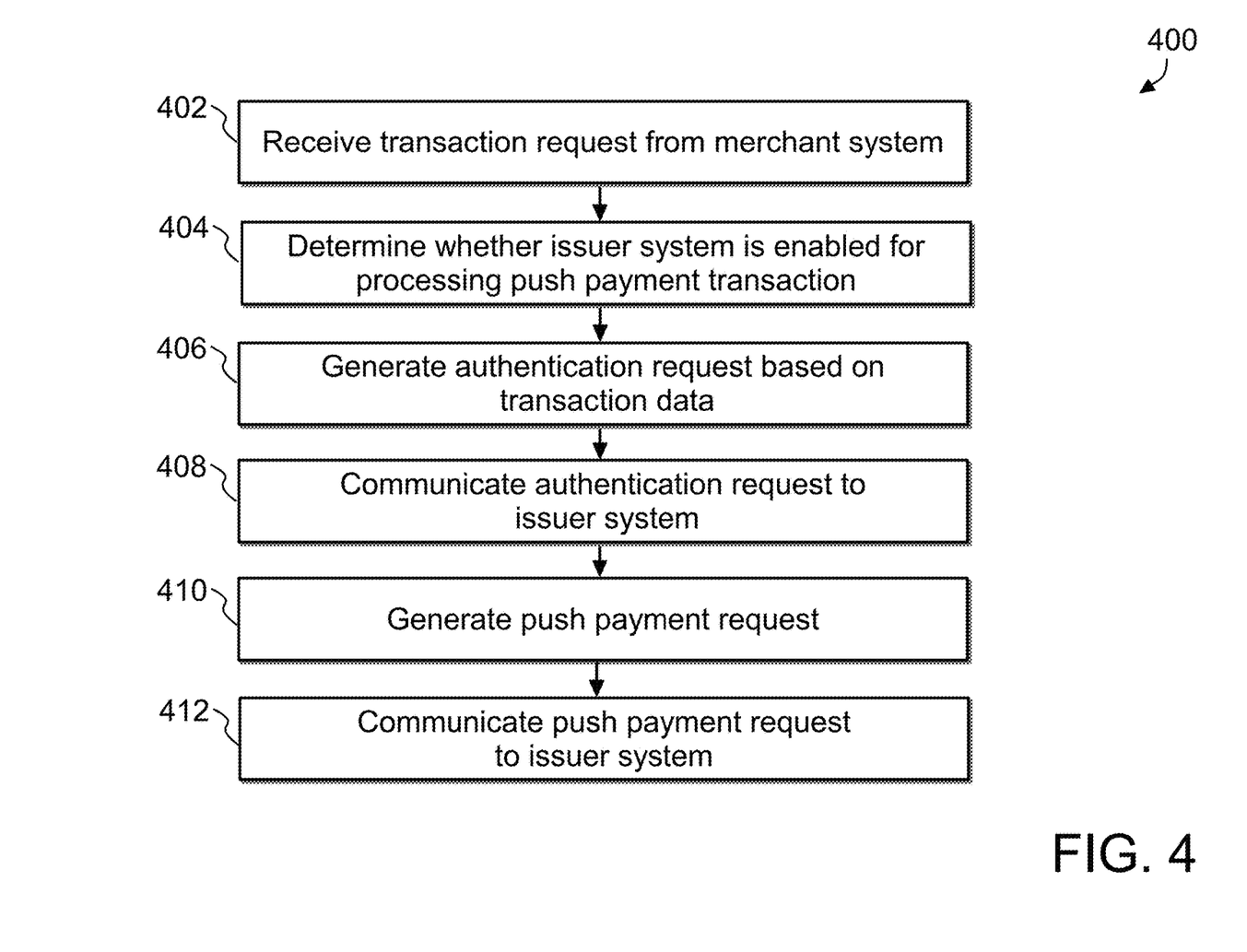
FIG. 4 is a flow diagram of one embodiment or aspect of a system and method for processing a transaction as a push payment transaction.

With specific reference to FIG. 4, and in some non-limiting embodiments or aspects, provided is a method 400 for processing a transaction as a push payment transaction. One or more steps of method 400 may be executed by a payment gateway processor, an issuer ACS (e.g., issuer authentication processing system) of the issuer system, another server or system, or a combination thereof. In step 402, at least one payment gateway processor may receive a transaction request from a merchant system. The transaction request may include transaction data including data associated with a payment device of a user, such as, but not limited to, transaction amount, transaction date, transaction time, transaction description, payment device identifier, payment device issuer identifier, payment device type, and/or the like. The transaction may include an electronic commerce transaction initiated by a communication from a computing device of the user to the merchant system (e.g., via an online store). The transaction may include a transaction at a physical storefront POS terminal. The payment device may be associated with an issuer system.

In step 404, at least one payment gateway processor may determine whether the issuer system is enabled for processing the transaction as a push payment transaction based on the transaction data. If the issuer system is determined to be enabled for processing the transaction as a push payment transaction, the method 400 may proceed to steps 406-412. In step 406, at least one payment gateway processor may generate an authentication request based on the transaction data. The authentication request may include an authentication verifying data element (e.g., EMV cryptogram, a header tag, metadata of a data object, etc.). In step 408, at least one payment gateway processor may communicate the authentication request to the issuer system (e.g., an issuer authentication processing system thereof). In step 410, in response to the issuer system authenticating the authentication request, at least one payment gateway processor or an authentication processor of the issuer system (e.g., an issuer authentication processing system thereof) may generate a push payment request including an account identifier associated with the merchant system. In step 412, at least one payment gateway processor or an authentication processor of the issuer system may communicate the push payment request to the issuer system (e.g., an issuer payment processing system thereof). Communicating the push payment request to the issuer system may cause the issuer system to process the transaction as a push payment transaction.

Although the disclosure has been described in detail for the purpose of illustration based on what is currently considered to be the most practical and non-limiting embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A method of processing a transaction as a push payment transaction, comprising:
 receiving, with at least one payment gateway processor, a transaction request from a merchant system, the transaction request comprising transaction data associated with a payment device of a user, the payment device associated with an issuer system;
 in response to receiving the transaction request from the merchant system:
 generating, with the at least one payment gateway processor, an authentication request based on the transaction data; and
 communicating, with the at least one payment gateway processor, the authentication request to an issuer authentication processing system of the issuer system;
 in response to the issuer authentication processing system authenticating the user based on the authentication request:
 receiving, with the at least one payment gateway processor, an authentication response from the issuer authentication processing system; and
 generating, with the at least one payment gateway processor or the issuer authentication processing system, a push payment request comprising the authentication response and an account identifier associated with the merchant system;

communicating, with the at least one payment gateway processor or the issuer authentication processing system, the push payment request to an issuer payment processing system of the issuer system; and in response to the issuer payment processing system validating the authentication response, initiating, with the issuer payment processing system, the push payment transaction from the issuer system to an acquirer system associated with the account identifier via a transaction processing system.

2. The method of claim 1, wherein the transaction comprises an electronic commerce transaction initiated by a communication from a computing device of the user to the merchant system.

3. The method of claim 1, wherein the authentication request comprises an authentication verifying data element.

4. The method of claim 1, further comprising, prior to generating the authentication request, determining, with the at least one payment gateway processor, whether the issuer system is enabled for processing the transaction as the push payment transaction based on the transaction data.

5. The method of claim 1, wherein communicating the push payment request to the issuer payment processing system causes the issuer payment processing system to process the transaction as the push payment transaction.

6. A system for processing a transaction as a push payment transaction, the system comprising:

at least one payment gateway server computer including at least one payment gateway processor, the at least one payment gateway server computer programmed and/or configured to:

receive a transaction request from a merchant system, the transaction request comprising transaction data associated with a payment device of a user, the payment device associated with an issuer system;

in response to receiving the transaction request from the merchant system:

generate an authentication request based on the transaction data; and communicate the authentication request to an issuer authentication processing system of the issuer system;

in response to the issuer authentication processing system authenticating the user based on the authentication request:

receive an authentication response from the issuer authentication processing system; and generate a push payment request comprising the authentication response and an account identifier associated with the merchant system; and communicate the push payment request to an issuer payment processing system of the issuer system; and a server computer of the issuer system, the server computer programmed and/or configured to:

in response to the issuer payment processing system validating the authentication response, initiate the push payment transaction from the issuer system to an acquirer system associated with the account identifier via a transaction processing system.

7. The system of claim 6, wherein the transaction comprises an electronic commerce transaction initiated by a communication from a computing device of the user to the merchant system.

8. The system of claim 6, wherein the authentication request comprises an authentication verifying data element.

9. The system of claim 6, wherein the at least one payment gateway server computer is further programmed and/or configured to, prior to generating the authentication request, determine whether the issuer system is enabled for processing the transaction as the push payment transaction based on the transaction data.

10. The system of claim 6, wherein communicating the push payment request to the issuer payment processing system causes the issuer payment processing system to process the transaction as the push payment transaction.

11. A computer program product for processing a transaction as a push payment transaction, the computer program product comprising at least one non-transitory computer-readable medium including program instructions that, when executed by at least one payment gateway processor or an issuer system, cause the at least one payment gateway processor or the issuer system to:

receive, with the at least one payment gateway processor, a transaction request from a merchant system, the transaction request comprising transaction data associated with a payment device of a user, the payment device associated with the issuer system;

in response to the at least one payment gateway processor receiving the transaction request from the merchant system:

generate, with the at least one payment gateway processor, an authentication request based on the transaction data; and communicate, with the at least one payment gateway processor, the authentication request to an issuer authentication processing system of the issuer system;

in response to the issuer authentication processing system authenticating the user based on the authentication request:

receive, with the at least one payment gateway processor, an authentication response from the issuer authentication processing system; and generate, with the at least one payment gateway processor or the issuer authentication processing system of the issuer system, a push payment request comprising the authentication response and an account identifier associated with the merchant system;

communicate, with the at least one payment gateway processor or the issuer authentication system of the issuer system, the push payment request to an issuer payment processing system of the issuer system; and in response to the issuer payment processing system validating the authentication response, initiate, with the issuer payment processing system of the issuer system, the push payment transaction to an acquirer system associated with the account identifier via a transaction processing system.

12. The computer program product of claim 11, wherein the transaction comprises an electronic commerce transaction initiated by a communication from a computing device of the user to the merchant system.

13. The computer program product of claim 11, wherein the authentication request comprises an authentication verifying data element.

14. The computer program product of claim 11, wherein the program instructions further cause the at least one payment gateway processor to, prior to generating the authentication request, determine whether the issuer system is enabled for processing the transaction as the push payment transaction based on the transaction data.

15. The computer program product of claim 11, wherein communicating the push payment request to the issuer payment processing system causes the issuer payment processing system to process the transaction as the push payment transaction.

\* \* \* \* \*